United States Patent [19]

Lippold

[11] Patent Number: 4,697,975
[45] Date of Patent: Oct. 6, 1987

[54] WHEELCHAIR CARRIER

[76] Inventor: Duane Lippold, 827 S. 121st St., Omaha, Nebr. 68154

[21] Appl. No.: 830,019

[22] Filed: Feb. 18, 1986

[51] Int. Cl.$^4$ .............................................. B60R 9/06
[52] U.S. Cl. ............................. 414/462; 224/42.03 R; 224/42.21; 414/921
[58] Field of Search ............... 414/462, 463, 466, 921; 224/42.03 R, 42.03 B, 42.21

[56] References Cited

U.S. PATENT DOCUMENTS

| | | | |
|---|---|---|---|
| 1,445,913 | 2/1923 | Roos | 414/466 X |
| 3,800,967 | 4/1974 | Kosecoff | 414/462 |
| 3,843,001 | 10/1974 | Willis | 414/462 |
| 3,921,842 | 11/1975 | Campbell | 414/462 |
| 4,189,274 | 2/1980 | Shaffer | 414/462 |
| 4,213,729 | 7/1980 | Cowles et al. | 414/462 |
| 4,275,981 | 6/1981 | Bruhn | 414/462 |
| 4,381,069 | 4/1983 | Kreck | 224/42.03 R X |
| 4,411,580 | 10/1983 | Kelly | 414/462 |

Primary Examiner—Leslie J. Paperner
Attorney, Agent, or Firm—Zarley, McKee, Thomte, Voorhees & Sease

[57] ABSTRACT

A wheelchair carrier is described which is mounted on the rearwardly extending hitch of a vehicle such as an automobile or the like. A platform is pivotally mounted on a horizontally extending support which is operatively mounted on the vehicle hitch. The platform may be pivotally moved from a horizontal carrying position to an inclined loading and unloading position. When the platform is in its inclined position, one end of the platform may be positioned beneath the handles of the folded wheelchair with the wheelchair then being moved towards the carrier. Pivotal movement of the carrier from its inclined position to its horizontal carrying position causes the wheelchair to be lifted from the ground and positioned on the carrier. The carrier is locked in its horizontal carrying position by means of a spring-loaded lock. The wheelchair is held on the carrier by means of a spring-loaded connector.

5 Claims, 7 Drawing Figures

WHEELCHAIR CARRIER

BACKGROUND OF THE INVENTION

This invention relates to a wheelchair carrier and more particularly to a wheelchair carrier which is mounted on the rear end of a vehicle such as an automobile or the like.

It has always been a difficult task to fold a wheelchair and place the same inside an automobile. This has been made even more difficult with the downsizing of automobiles. In an effort to provide a more convenient means for transporting a wheelchair from one location to another, some prior art devices have been provided wherein the wheelchair is supported on some sort of carrier positioned on the rear of the automobile. However, the prior art wheelchair carriers are not convenient to use. One of the disadvantages of the prior art wheelchair carriers is that the wheelchair must be lifted from the ground and placed in some sort of receiving bracket. Many persons are simply unable to lift the wheelchair from the ground to place the same in the carrier.

It is therefore a principal object of the invention to provide an improved wheelchair carrier.

A further object of the invention is to provide an improved wheelchair carrier which is mounted on the rear end of a vehicle and which is convenient to use.

A further object of the invention is to provide a wheelchair carrier for mounting on the hitch of a vehicle which does not require that the wheelchair be manually lifted from the ground.

Yet another object of the invention is to provide a wheelchair carrier which positively locks the wheelchair in position.

Still another object of the invention is to provide a wheelchair carrier which is quickly and easily removably mounted on the hitch of a vehicle.

Still another object of the invention is to provide a wheelchair carrier which is durable in use and refined in appearance.

These and other objects will be apparent to those skilled in the art.

SUMMARY OF THE INVENTION

Figure 1:
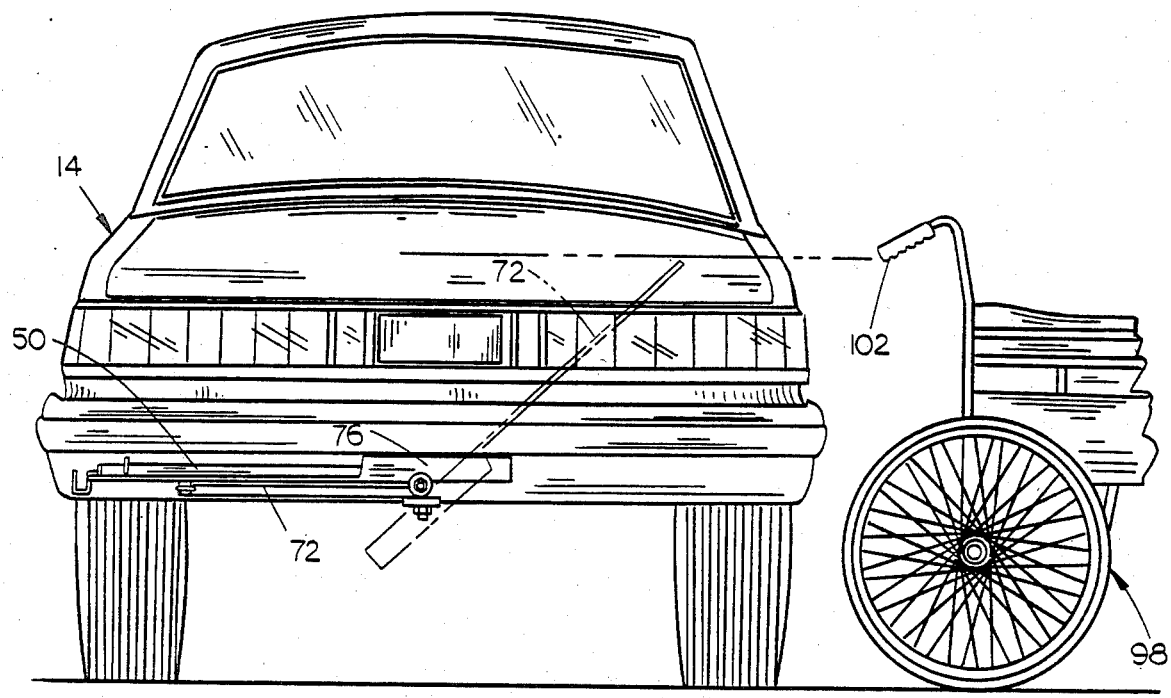
FIG. 1 is a rear view of a vehicle having the carrier of this invention mounted thereon.

A wheelchair carrier is described which is mounted on the rear end of a vehicle. The carrier is mounted on the rearwardly extending hitch of the vehicle and includes an elongated support means which extends rearwardly from the hitch. A generally rectangular platform is pivotally mounted on the rearwardly extending support means and is pivotally movable from a horizontal carrying position to an inclined loading and unloading position. The longitudinal axis of the platform is disposed transversely with respect to the central front-to-rear axis of the vehicle. The pivotal axis of connection between the platform and the support means is transverse with respect to the longitudinal axis of the platform means and is positioned adjacent one end thereof so that the platform may be rotated more than 90° from the horizontal position to the inclined position. When the carrier is in the inclined position, the upper end of the platform is positioned beneath the handles of the wheelchair and the wheelchair is moved towards the carrier. The platform is then pivotally moved from the inclined position to the horizontal position with the platform engaging the handles of the wheelchair to lift the wheelchair from the ground and position the wheelchair on the carrier. Locking means is provided for locking the carrier in its horizontal carrying position and for locking the wheelchair on the carrier.

DESCRIPTION OF THE PREFERRED EMBODIMENT

The wheelchair carrier of this invention is referred to by the reference numeral 10 and is adapted to be mounted on the trailer hitch 12 of a vehicle 14.

Carrier 10 includes a mounting bracket 16 comprising a plate 18 having a bolt 20 extending downwardly therefrom which is adapted to be extended through the opening 22 in the hitch 12. Nut 24 is threadably secured to the lower end of the nut 20. Tube 26 is secured to plate 18 by welding or the like and has a pair of openings 28 provided in its opposite side walls adapted to receive a pin 30. Retainer 32 is extended through the opening 34 in the pin 30 to maintain the pin 30 in the openings 28.

Tubular support 36 is adapted to be inserted into the tube 26 and maintained therein by means of the pin 30 adapted to be received by the opening 38 and the openings 28. Angle bracket 40 is welded to the rearward end of the support 36 and extends transversely therefrom.

The forward end of shaft 42 is secured to the rearward end of support 36 by welding or the like and extends rearwardly therefrom. Shaft 42 is provided with threaded portions 44 and 46 at its forward and rearward ends respectively. A self-locking nut 48 is threadably mounted on the threaded portion 44 and has arm 50 secured thereto by means of bracket 52. Self-locking nut 48 permits the support 50 to be moved from the upright position illustrated in FIG. 7 to the horizontal position illustrated in FIG. 5. The numeral 54 refers to a connector which is provided at the upper end of the support 50 which movably extends through openings 56 and 58 provided in the support 50. Connector 54 includes a handle 60 at one end and an arcuate hook portion 62 at its other end. Connector 54 is also provided with a threaded or serrated portion 64 intermediate its ends. A spring-loaded plunger 66 is mounted in the upper end of support 60 and has a block member 68 secured to its lower end which is adapted to engage the threaded portion 64 of connector 54 to maintain the connector 54 in its various sliding positions. Spring 70 yieldably urges the block member 68 into frictional engagement with the threaded portion 64 of connector 54.

Figure 2:
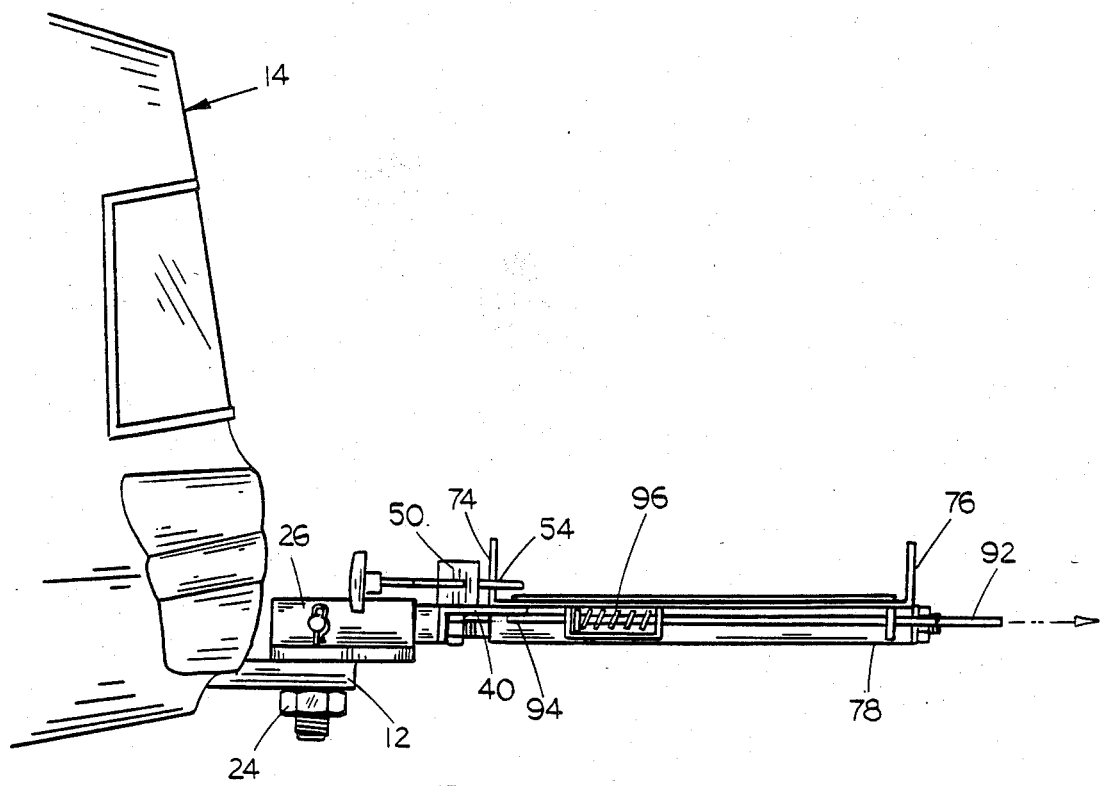
FIG. 2 is a side view of the carrier of FIG. 1.
Figure 6:
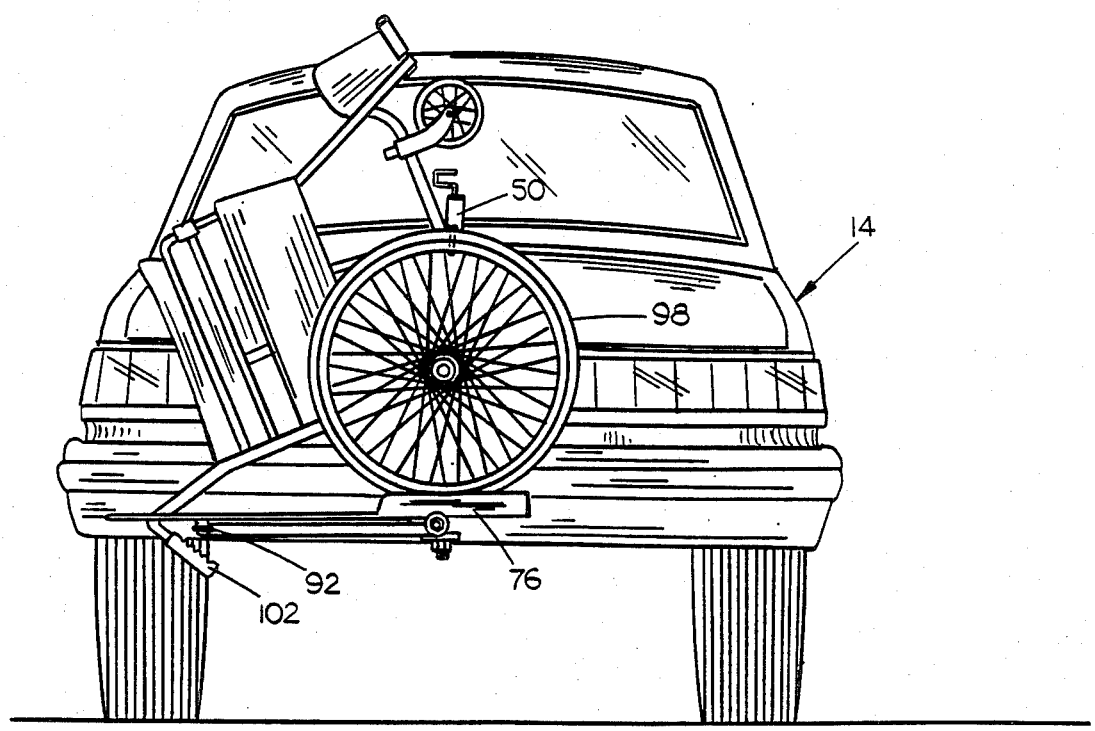
FIG. 6 is a view similar to FIG. 5 except that the carrier is illustrated in its transport position with the wheelchair mounted thereon.
Figure 7:
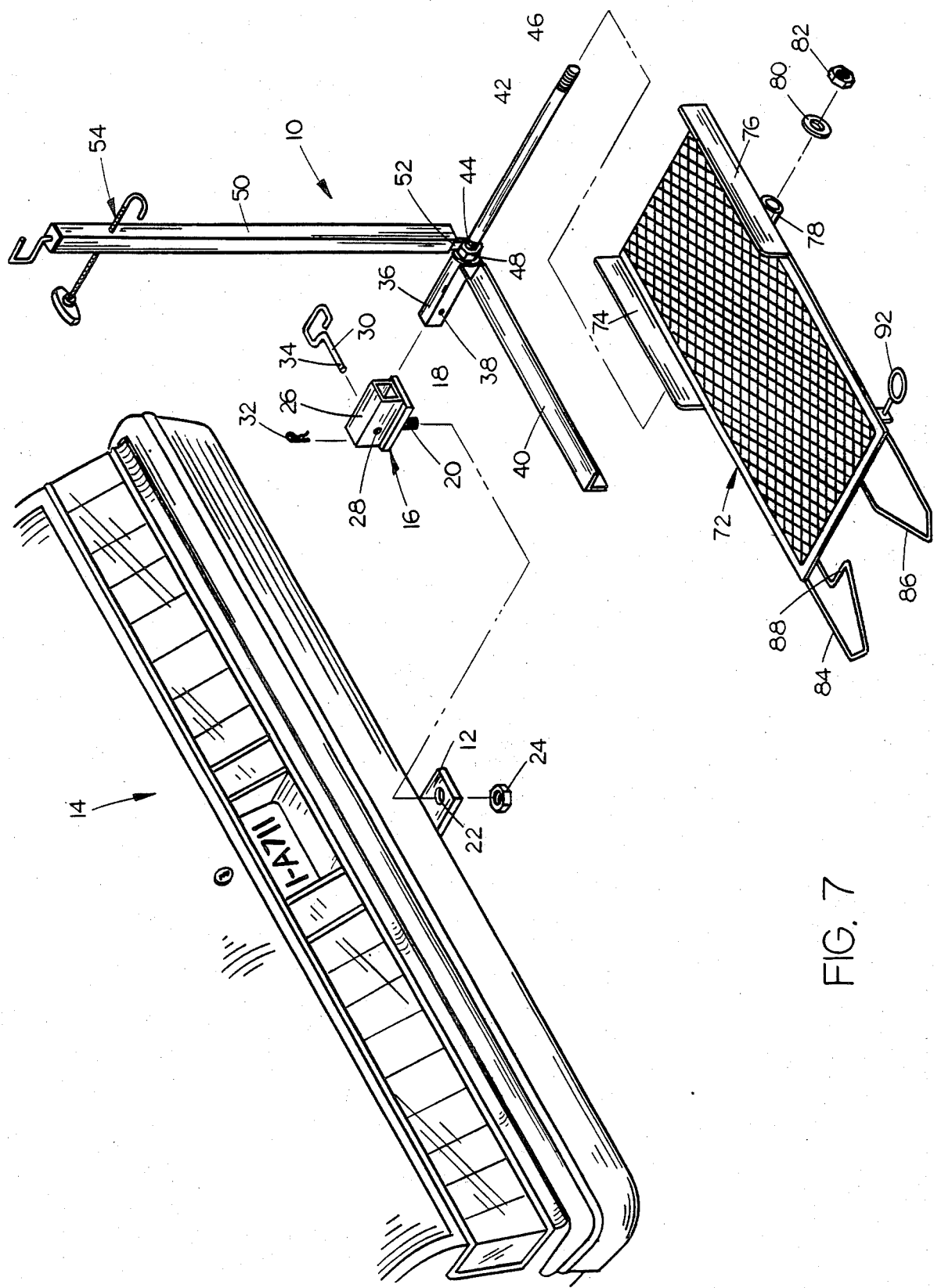
FIG. 7 is an exploded rear perspective view of the carrier of this invention.

The numeral 72 designates a platform having a pair of upstanding flanges 74 and 76 provided adjacent one end thereof. Tubular member 78 is secured to one side of platform 72 which is rotatably mounted on shaft 42. Platform 72 is maintained on shaft 42 by means of washer 80 and 82. Platform 72 is also provided with a pair of guide members 84 and 86 which extend from one end thereof as seen in FIG. 7. Guide member 84 is provided with a shoulder portion 88 as will be described in more detail hereinafter. Platform 72 is also provided with a spring-loaded locking lever 90 having a gripping portion 92 at one end thereof and a free end 94 at the other end thereof. Spring 96 yieldably urges the locking lever 90 to the left as viewed in FIG. 3 or beneath the horizontal portion of angle bracket 40. When the platform 72 is in the horizontal carrying position of FIGS. 2 and 6, the free end 94 of locking lever 90 prevents the platform 72 from being moved upwardly relative to the angle bracket 40. As seen in FIG. 2, when platform 72 is in the horizontal carrying position, the forward end of platform 72 rests on the angle bracket 40.

Figures 3, 4:
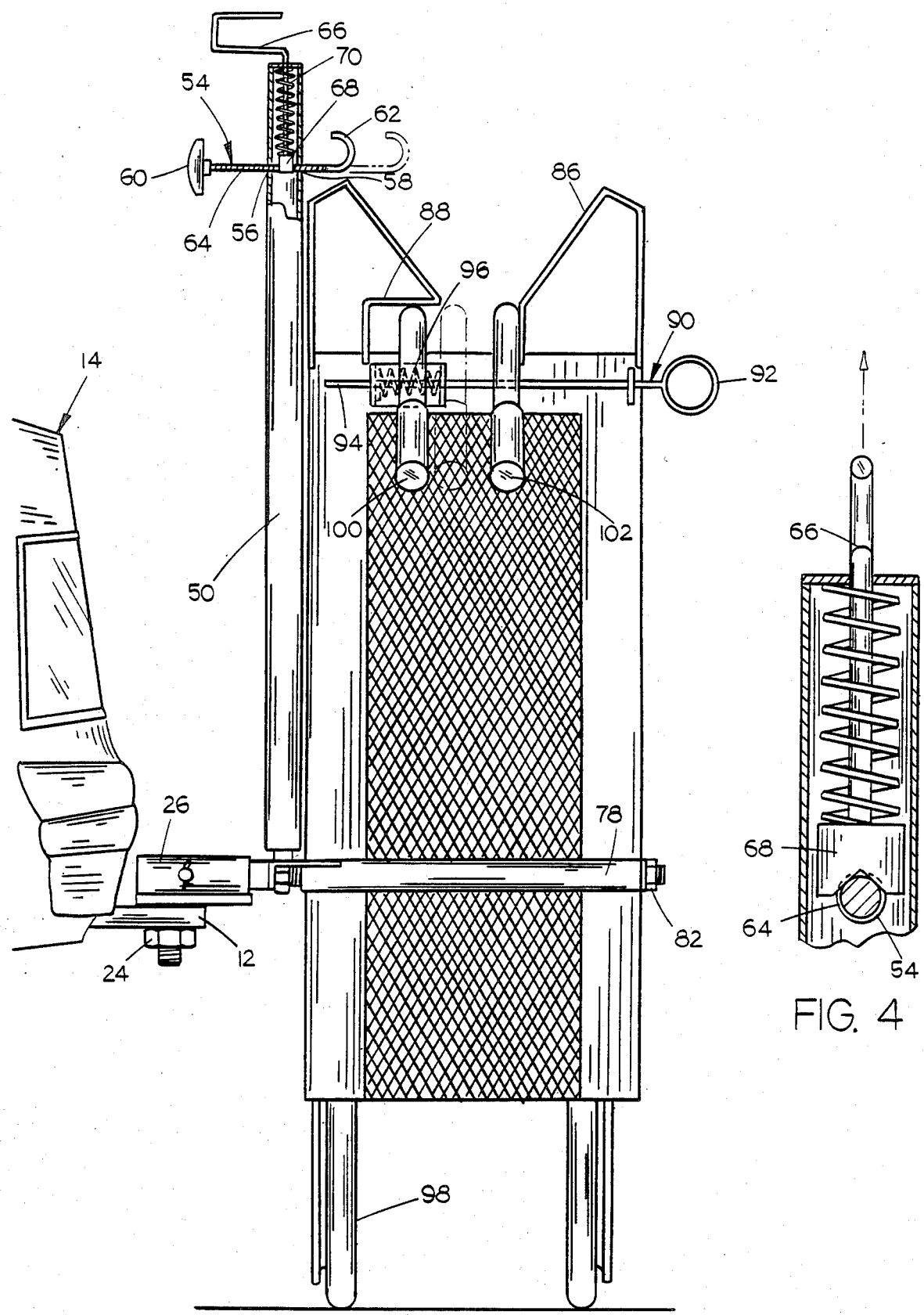
FIG. 3 is a side view illustrating a wheelchair being loaded onto the carrier.
FIG. 4 is an enlarged sectional view illustrating the means by which the upper connector element is held in position.
Figure 5:
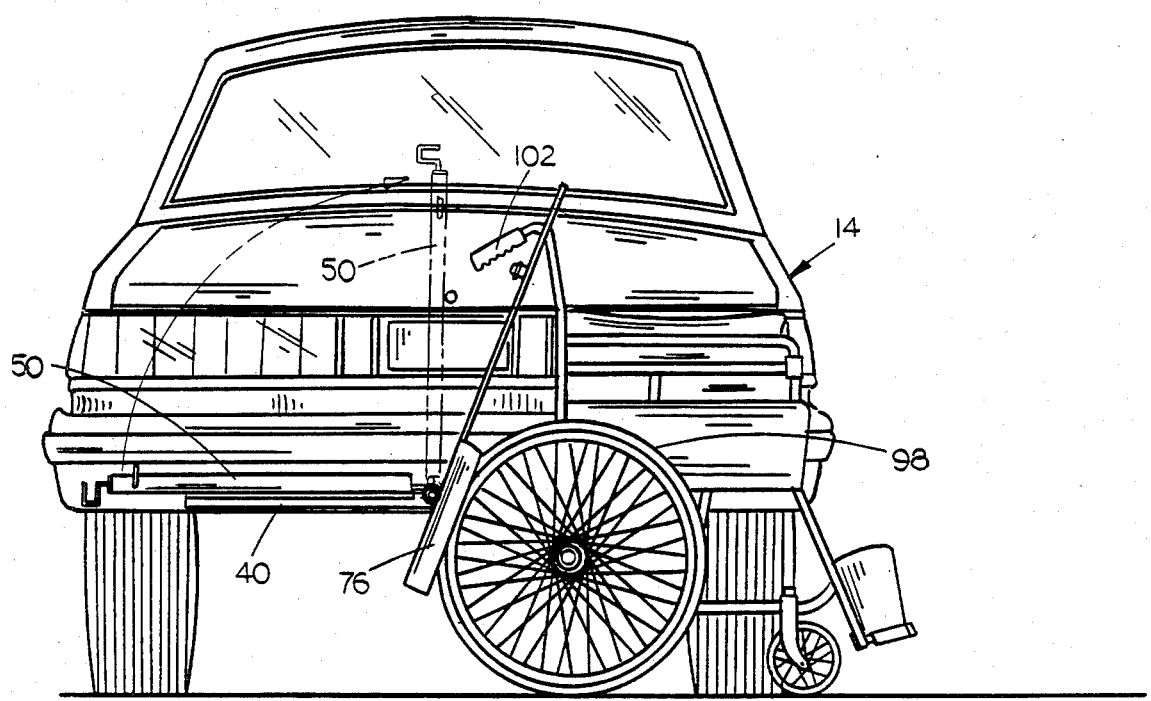
FIG. 5 is a rear view of the carrier illustrating the manner in which the wheelchair is loaded onto the carrier.

To load the wheelchair 98 on the carrier 10, the procedure is as follows. Assuming that the carrier 10 is in the position illustrated in FIG. 1, locking lever 92 is pulled rearwardly until the free end thereof disengages from angle bracket 40. Platform 72 is then pivotally moved upwardly until the members 84 and 86 are positioned beneath the handles 100 and 102 of the folded wheelchair. The wheelchair is then rolled toward the carrier until the handles 100 and 102 are positioned between the members 84 and 86. This is accomplished without lifting the wheelchair since the wheels are in ground engagement. The platform is then rotatably moved to the horizontal carrying position such as illustrated in FIG. 5. Rotation of the platform 72 causes the handle members 100 and 102 of the wheelchair to move downwardly relative to the members 84 and 86. When handle member 100 passes below shoulder 88, the handle member 100 moves forwardly, due to the construction of the wheelchair, and is positioned below the shoulder 88 which serves to maintain the wheelchair handles in position as illustrated in FIGS. 3 and 6. The wheelchair is rotated to the position of FIG. 6 and the forward or free end of the locking lever 92 is positioned beneath the angle bracket 40 to maintain the platform 72 in position. The wheels of the wheelchair rest on the platform 72 between the flanges 74 and 76.

Support 50 is then pivotally moved upwardly from its horizontal position to a vertical position. Member 66 is then vertically moved upwardly against the resiliency of the spring so that connector 54 may be slidably and rotatably moved relative to the post 50 so that the hook 62 may be engaged with a portion of the wheelchair. After the hook portion 62 has been so engaged, handle 60 is pulled forwardly to positively connect the hook element 62 to the wheelchair. Plunger member 66 is then lowered so that block member 68 frictionally engages the serrated portion of the connector 54.

Thus it can be seen that a novel wheelchair carrier has been provided which is extremely easy to use. The design of the carrier is such that the person positioning the wheelchair on the carrier need not manually lift the wheelchair from the ground for placement on the carrier since such is accomplished by the pivotal movement of the platform from its inclined position to its horizontal carrying position due to the engagement of the end of the platform with the handles as previously described. The carrier of this invention not only ensures that the carrier will be positively locked in its horizontal carrying position but also ensures that the wheelchair will be securely locked or held onto the carrier during the use thereof. It can therefore be seen that the carrier of this invention accomplishes at least all of its stated objectives.

I claim:

1. In combination,
   a vehicle having a rearwardly extending hitch means at the rearward end thereof,
   a carrier mounted on said hitch means for supporting and carrying a wheelchair thereon,
   said carrier comprising:
   (1) a support means secured to said hitch means and extending horizontally rearwardly therefrom;
   (2) a generally rectangular platform means, including first and second ends, selectively pivotally mounted on said support means and being pivotally movable from a horizontal carrying position to an inclined loading and unloading position, the longitudinal axis of said platform means being disposed transversely with respect to the central front-to-rear axis of the vehicle, the pivotal axis of connection between said platform means and said support means being transverse with respect to the longitudinal axis of said platform means, said pivotal axis being positioned between the center and said first end of said platform means whereby said platform means may be rotated more than 90° from said horizontal position to said inclined position so that said second end of said platform means will be positioned at a height below the handles of the wheelchair to be carried,
   (3) means on said second end of said platform means for engagement with the handles of the wheelchair to be carried for loading the wheelchair onto said carrier and for maintaining the wheelchair on said carrier,
   (4) means for maintaining said platform means in said horizontal position.

2. The combination of claim 1 wherein a pivotal connection arm means is mounted on said carrier for connection to the wheelchair when said platform means is in its said horizontal position.

3. The combination of claim 1 wherein said means for maintaining said platform means in said horizontal position comprises a selectively releasable locking means.

4. The combination of claim 1 wherein said means on said second end of said platform means comprises a pair of spaced-apart guide members which are adapted to receive the handles of the wheelchair therebetween.

5. In combination,
   a vehicle having a rearwardly extending hitch means at the rearward end thereof,
   a carrier mounted on said hitch means for supporting and carrying a wheelchair thereon,
   said carrier comprising:
   (1) a support means secured to said hitch means and extending horizontally rearwardly therefrom;
   (2) a generally rectangular platform means, including first and second ends, selectively pivotally mounted on said support means and being pivotally movable from a horizontal carrying position to an inclined loading and unloading position, the longitudinal axis of said platform means being disposed transversely with respect to the central front-to-rear axis of the vehicle, the pivotal axis of connection between said platform means and said support means being transverse with respect to the longitudinal axis of said platform means, said pivotal axis being positioned between the center and said first end of said platform means whereby said platform means may be rotated more than 90° from said horizontal position to said inclined position so that said second end of said platform means will be positioned at a height below the handles of the wheelchair to be carried, (3) means on said second end of said platform means for engagement with the handles of the wheelchair to be carried for loading the wheelchair onto said carrier and for maintaining the wheelchair on said carrier, (4) means for maintaining said platform means in said horizontal position, said means on said second end of said platform means comprising a pair of spaced-apart guide members which are adapted to receive the handles of the wheelchair therebetween, one of said guide members having a shoulder means provided thereon which is positioned above one of the handles of the wheelchair when the handles are received therebetween.

* * * * *